Jan. 18, 1966  D. H. THORBURN  3,229,929
PNEUMATIC TUBE SIGNAL SYSTEM — MAGNETIC
Filed Dec. 10, 1962  2 Sheets-Sheet 1
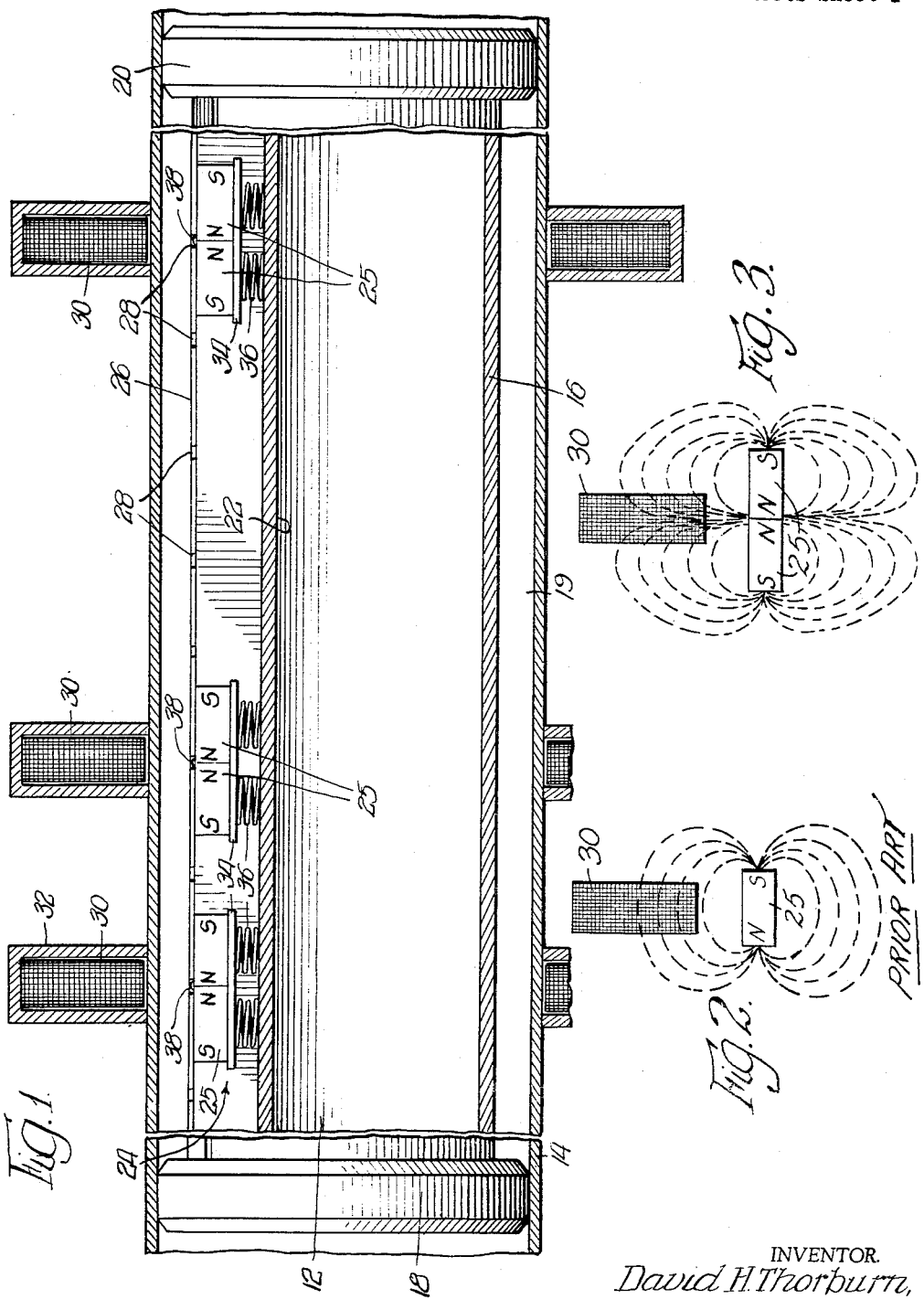
INVENTOR.
David H. Thorburn,
BY
Byron, Hume, Groen & Clement
Attys

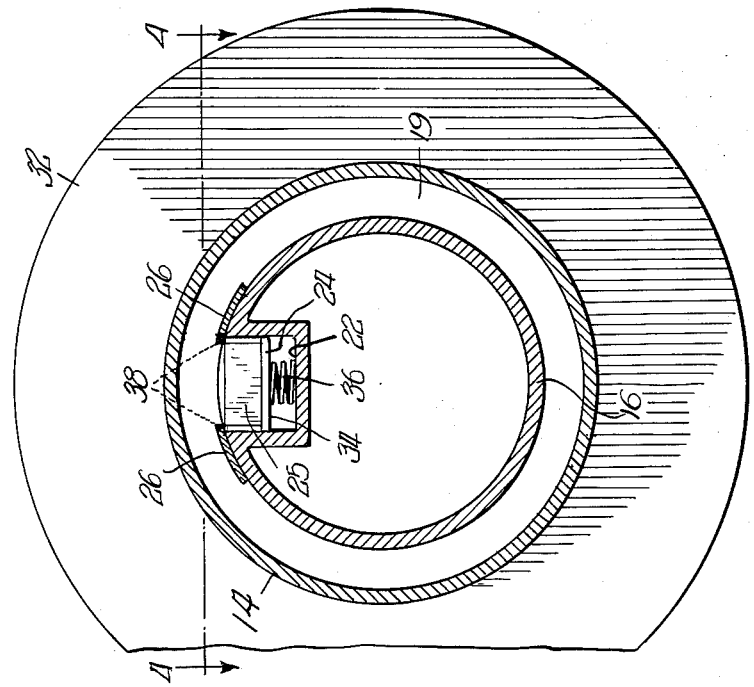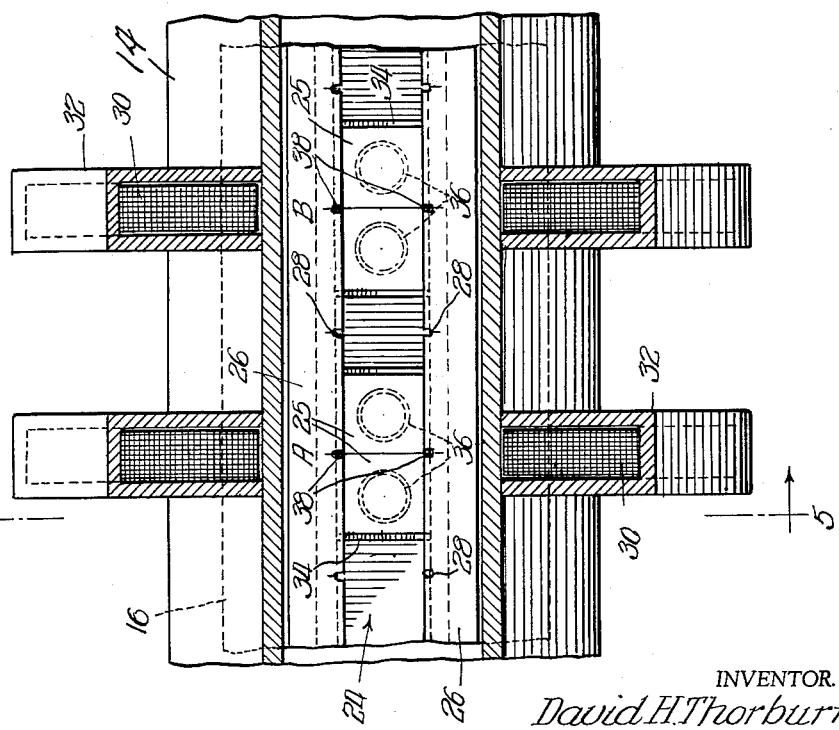

United States Patent Office 3,229,929
Patented Jan. 18, 1966

3,229,929
PNEUMATIC TUBE SIGNAL SYSTEM—MAGNETIC
David H. Thorburn, Oak Park, Ill., assignor to The Powers Regulator Company, Skokie, Ill., a corporation of Illinois
Filed Dec. 10, 1962, Ser. No. 243,276
10 Claims. (Cl. 243—1)

This invention pertains to a magnetic signalling device and in particular to an improvement for shaping the field created by the magnets so as to facilitate detection thereof.

Magnetic signalling devices are well known and one particular field in which they have been used to great advantage is that of pneumatic carriers. Specifically, the magnets are mounted on the carrier so that their fields may be detected by suitable receivers placed on the tube through which the carrier travels. Generally the magnets are mounted so as to be adjustable whereby their spacing may be varied to pre-selected distances. These distances indicate the destination of the carrier. For example, see the patents to Chambers No. 1,983,342 and Hafner Nos. 2,900,146 and 2,970,791.

One of the problems in using magnets is the ability to generate on pneumatic carriers a field that may be readily detected by the receivers. However, this is not a case of merely selecting a bigger or a stronger magnet. Specifically, it is desirable that the magnets have a relatively narrow field ("narrow" refers to the distance between the poles) so as to induce a pulse-like signal in the sensors that is of a relatively high amplitude but short time duration. In this manner, as will be seen later on, the narrow field permits a greater number of recognizable positions of the magnets on the carrier than if the field were relatively broad. The greater number of positions in turn permits a greater number of receiving stations.

It will be noted that the carriers travel quite rapidly through the tubes so as to limit the time in which the magnet is in the proximity of the receiver. This in itself increases the difficulty of generating a signal which is sufficiently strong to trigger the sensing mechanism and to cause it to provide the desired results.

To further complicate the matter the magnets must be mounted on the carrier so as not to inhibit the movement of the latter through the tube in which it travels. This in turn means that the magnets are spaced from the interior wall of the tube and in turn the sensors mounted on the exterior wall thereof.

It is an object of the invention to provide a magnetic signalling device which renders the magnetic field readily detectable particularly for the size and strength of the magnets. A further object of the invention resides in the provision of an arrangement of a plurality of magnets which cause a mutual distortion of the fields generated thereby so as to facilitate the detection thereof.

A still further object of the invention resides in the provision of a magnetic signalling device which is especially adapted to be used in conjunction with pneumatic carriers.

A still further object of the invention resides in the provision of an arrangement of magnets which cause a radial extension of the magnetic field from the carrier whereby the lines of force within the field may be readily passed through sensor elements mounted on the carrier tube.

The invention may be broadly described as a magnetic signalling device which comprises a plurality of magnets. The magnets are arranged so that like poles are placed in a closely spaced or touching relationship. This relationship as will be seen hereinafter causes a distortion or more specifically an extension of the magnetic field. The extension permits a greater number of lines of force to pass through the detecting device, thereby generating a stronger signal.

The aforementioned features and objects of the invention will be apparent upon reading of the specification with reference to the following drawings.

In the drawings:

FIGURE 1 is a sectional view of the invention as used in conjunction with a pneumatic carrier system;

FIGURE 2 is a schematic view of a conventional bar magnet showing the field relative to a sensor coil;

FIGURE 3 is a similar schematic arrangement showing a pair of bar magnets arranged in accordance with the invention;

FIGURE 4 is a sectional view taken along the lines 4—4 in FIGURE 5; and

FIGURE 5 is a sectional view taken along the lines 5—5 in FIGURE 4.

Although the invention will be described as used in conjunction with pneumatic carrier systems it is to be understood that this is merely by way of example and not to be construed as a limitation. It will be apparent that the signalling device may be used in any type of system in which a magnetic field for purposes of signalling or the like is of utility. It will be further apparent that the various elements utilized in the construction of the invention and the carrier system with which it is associated may be constructed of any suitable materials that will permit them to perform in the intended manner.

Referring now to FIGURE 1 there is shown one form of the invention as mounted on a pneumatic carrier 12 which is passing through the conveyor tube 14. The conveyor system may be of any suitable type such as those shown in the aforementioned patents to Hafner and Chambers. Generally, the system will include one or more loops constructed of tubing 14, a plurality of dispatching and receiving stations depending from said loops, means for motivating air through the tube whereby a carrier inserted therein will be motivated in the direction of air movement. The system will further include a sensing means of some suitable type in which the carriers may be diverted from one loop to another or from a loop into any one of the receiving stations thereon. In this particular instance, the sensing means will be of the type adapted to receive a magnetic field and to generate signal which will actuate means for diverting the carrier. One form of sensor is an inductance coil in which the passing of a field therethrough will cause an electric current to be generated.

The carrier unit comprises a substantially cylindrical member 16 having the ends 18 and 20. The ends 18 and 20 are only smaller than the interior diameter of the tube 14 by an amount sufficient to permit the carrier to pass. The member 16 is substantially smaller than the tubing so that when supported by the ends 18 and 20 there is an annular gap 19 between the member 16 and the tube 14. The gap 19 constitutes the clearance which permits the carrier to negotiate curves in the conveyor system. The carrier 16 is provided with an access opening (not shown) which generally will take the form of a small door that may be locked in a closed position but readily opened when desired. The purpose of the door is, of course, to permit insertion and withdrawal of materials, papers and the like that are to be conveyed by the carrier.

The carrier, specifically the tube 16, is provided with a slot 22 which extends axially thereof and in which are disposed the magnetic units generally denoted by the numeral 24. Each magnetic unit includes a pair of bar magnets 25, as will be more fully explained hereinafter. The slot 22 extends between the ends 18 and 20 but terminates short thereof. As can be seen in FIGURE 5 the slot 22 extends about one-forth of the diameter across the tube 16. A pair of flange members 26 are mounted on the tube 16 so as to project over the slot 22. Thus the opening intermediate the flange members 26 is materially smaller than the width of the slot 22. The flange members 26 are provided with a plurality of slits 28 which provide means for detachably fixing the magnetic units in pre-selected positions, as will be seen later on.

On the exterior of a tube 14 are the sensor coils 30. The coils 30 are annular in shape and extend around the tube 14. The coils 30 may be of a conventional construction of the type adapted to generate an electrical signal when the lines of force of a magnetic field are passed therethrough. The signal from the coil is in turn fed through a suitable circuit (not shown) which is adapted to actuate the various components in the carrier system for controlling the destination of a carrier. A magnetically permeable sheath 32 is mounted on each of the coils 30 in order to enhance the signal generated by the magnetic field. The coils 30 are spaced at pre-selected distances so that when a carrier passes thereby having magnets mounted thereon and spaced in an identical manner the three coils are triggered simultaneously. Generally the circuits used in the construction and operation of such carrier systems operate on the principle that a simultaneous triggering of a plurality of coils is necessary before the circuit will make any change in the path of the carrier. For example see the aforementioned patents to Chambers and Hafner.

It is well known that as a magnet passes adjacent a coil the lines of force of the former cut the latter to generate an E.M.F. The greater the number of lines of force and their density, the greater the E.M.F. Since the magnets on a carrier must be relatively small and are of necessity placed some distance away from the coils 30 because of the intervening tube 14 and the geometry of the carrier 12, to provide the necessary clearance it has been found that the signal is relatively weak compared to the magnitude of the field. Thus it is readily apparent that a great portion of the lines of force are not passed through the coil but rather extend directly between the poles of the magnet.

Referring now to FIGURES 2 and 3, there are shown schematic illustrations of a conventional magnet and the unique arrangement embodying the invention. In FIGURE 2, it is apparent that due to the inherent spacing between the magnet and the coil only a small portion of the magnetic field is brought into contact with the coil 30. Thus a great many of the lines of force are lost so that there is considerable inefficiency in the generation of a signal.

In FIGURE 3 the magnets are arranged so that their like poles are in touching or at least a closely spaced relationship. In this instance the north poles are in such relationship, however south poles could be also so arranged as well as both of the poles. It is well known that like poles and the fields from the same repel. This causes a distortion of the magnetic field as shown in FIGURE 3 so that the apex of the field occurs at a distance considerably farther from the magnet than of a single magnet of the same or even greater size such as shown in FIGURE 2. By extending the field, it is possible to bring a considerably greater number of lines of force into contact with the coil 30. It has been found that the distorted field provides a relatively high density field of a relatively narrow band or width which creates a signal of relatively high amplitude and a sharp peak. Thus the invention does not merely provide a stronger signal but it shapes the signal so as to bring more lines of force into contact with the sensor coil and to provide a sharp, distinct signal which can be readily utilized in the actuation of the associated circuit.

The magnetic units 24 are composed of a pair of bar magnets 25 which are arranged so that a pair of like poles are in a closely associated relationship. The magnets may be placed in a touching relationship or slightly separated with a cushioning element such as a thin plastic washer placed therebetween. The plastic washer serves to protect the associated faces of the magnet but is sufficiently thin so as to have a minimal effect on the relationship of the fields. Each pair of magnets 25 are secured to a platform 34 by any suitable means. The platform 34 will of necessity be of a non-magnetic material since otherwise it would provide a magnetic bridge between the poles of the respective magnets. The platforms 34 are biased upwardly by means of the spring members 36. Each of the platforms is provided along its sides with the lugs 38 which are received in the slits 28. The springs 36 bias the lugs 38 into the slits 28 so as to provide a detent which prevents inadvertent displacement of the associate magnet unit.

As can be seen in FIGURE 4, one of the flanges 26 is provided with a suitable scale or indicia so as to visually designate the slits 28. This arrangement facilitates the selection of the desired combination of positions for the magnetic units in order to send a carrier to a preselected destination. By way of example, the scale could correspond to the linear distance from one end of the carrier. In such arrangement one unit could be positioned at the end with the other two being spaced therefrom at selected positions. When the carrier passes a sensor having coils arranged corresponding to the positions of the magnetic units, the sensor circuit would then be energized and in turn cause appropriate changes in the system.

The magnetic units 24 may be moved by pressing the same downwardly in the slot 22 so as to disengage the lugs 38 from the slits 28. The magnets may then be slid along the slot 28 to the desired position. The downward pressure is then relieved thus permitting the springs to force the magnets upwardly so that there is engagement between the lugs 38 and the slits 28. In this manner it is possible to selectively position the magnetic units to any desired spacing which will correspond with one of the sensor units in the system. When the carrier passes that unit the magnets will simultaneously energize the sensor coils so as to trigger the associated circuit. As mentioned previously, the circuit will in turn actuate suitable means for directing the carrier to the pre-selected destination.

It will be noted that while the invention has been described with reference to a carrier utilizing three of the magnetic units that this is merely by way of example. Specifically, a greater or lesser number of the magnets may be used per carrier. Furthermore the invention may be used in any environment in which a magnetic field is used for generating a signal.

The magnets may be of any desired shape as well as the bar construction shown in the drawings and described hereinbefore. For example horseshoe magnets as well as specially shaped magnets that are of recent development may be utilized where desired.

Although certain specific terminology and configurations have been utilized in the description of the invention, it is to be understood that this is primarily by way of example and not to be construed as a limitation. It will be apparent to those skilled in the art that modifications may be made within the scope of the claims without departing from the spirit of the invention.

I claim:

1. In a pneumatic carrier, the invention comprising a pair of magnets mounted on said carrier, said magnets being co-axially arranged parallel to the axis of said carrier so that one pole of one magnet is in closely associated relationship with the like pole on the other magnet whereby the fields of said one pole and said like pole are distorted outwardly in at least one predetermined direction.

2. In a pneumatic carrier of a generally tubular configuration closed at the ends, the invention comprising a pair of magnets mounted externally on said carrier intermediate said ends, said magnets being co-axially arranged parallel to the axis of said carrier so that one pole of one magnet is in a closely associated relationship with the like pole on the other magnet whereby the fields of said one pole and said like pole are distorted outwardly in at least one predetermined direction.

3. In a pneumatic carrier of a generally tubular configuration closed at the ends, the invention comprising a pair of magnets mounted externally on said pneumatic carrier intermediate said ends, said magnets being co-axially arranged parallel to the axis of said carrier so that one pole of one magnet is in a closely associated relationship with the like pole on the other magnet whereby the fields of said one pole and said like pole are distorted outwardly in a radial direction from said carrier.

4. In a pneumatic carrier system comprising a tubular conduit, a pneumatic carrier adapted to travel through said conduit, said pneumatic carrier being substantially of the same tubular configuration as said conduit and being closed at the ends, the invention comprising a pair of magnets mounted on said carrier, said magnets being co-axially arranged parallel to the axis of said carrier so that one pole of one magnet is in a closely associated relationship with the like pole on the other magnet whereby the fields of said one pole and said like pole are distorted outwardly in a radial direction from said carrier toward said conduit.

5. In a pneumatic carrier system composed of a tubular conduit, a pneumatic carrier adapted to travel through said conduit, said carrier being of a tubular configuration substantially the same as said conduit and being closed at the ends, means mounted at a pre-selected position on said conduit for detecting the presence of a moving magnetic field, the invention comprising a pair of magnets mounted on said carrier, said magnets being co-axially arranged parallel to the axis of said carrier so that one pole on one magnet is in a closely associated relationship with the like pole on the other magnet whereby the fields of said one pole and said like pole are distorted outwardly in a radial direction from said carrier toward said means for detecting when said carrier travels past said means for detecting.

6. A pneumatic carrier comprising a generally tubular envelope being closed at the ends, a pair of magnets mounted externally on said tubular portion intermediate said ends, said magnets being co-axially arranged parallel to the axis of said tubular portion so that one pole of one magnet is in a closely associated relationship with the like pole on the other magnet whereby the fields of said one pole and said like pole are distorted outwardly in a radial direction from said carrier.

7. A pneumatic carrier comprising a tubular portion being closed at the ends to form a generally tubular envelope, a plurality of pairs of magnets mounted on said tubular envelope the magnets in each of said pairs being co-axially arranged parallel to the axis of said tubular envelope so that one pole of one magnet is in a closely associated relationship with the like pole on the other magnet whereby the fields of said one pole and said like pole are distorted outwardly in a radial direction from said carrier.

8. A pneumatic carrier comprising a tubular portion closed at the ends to form a substantially tubular envelope, a plurality of pairs of magnets mounted on said tubular envelope the magnets in each of said pairs being co-axially arranged parallel to said tubular envelope so that one pole of one magnet is in a closely associated relationship with the like pole on the other magnet whereby the fields of said one pole and said like pole are distorted outwardly in a radial direction from said carrier, and means for adjusting the distances between said pairs of magnets.

9. A pneumatic carrier comprising a tubular portion closed at the ends to form a generally tubular envelope, a groove extending axially of said tubular portion, a plurality of pairs of magnets disposed within said groove, the magnets in one of said pairs being co-axially arranged axially of said tubular portion so that one pole of one magnet is in a closely associated relationship with the like pole on the other magnet whereby the fields of said one pole and said like pole are distorted outwardly in a radial direction from said carrier, said pairs of magnets being movable within said groove so as to vary the spacing therebetween, and spring means for detachably holding each of said pairs of magnets at pre-selected positions along said groove.

10. In a signalling device in which a magnetic unit is utilized for generating a signal in response to a sensed condition, the invention comprising means for sensing a moving magnetic field and a pair of magnets mounted on a device movable relative to said sensing means for generating said field, said magnets being co-axially arranged parallel to the direction of movement of said movable device so that one pole of one magnet is in closely associated relationship with the like pole on the other magnet whereby the fields of said one pole and said like pole are distorted outwardly in at least one predetermined direction.

References Cited by the Examiner

UNITED STATES PATENTS

| 2,970,791 | 2/1961 | Hafner | 243—35 |
| 2,997,253 | 8/1961 | Mittag | 243—16 |

FOREIGN PATENTS

| 343,886 | 2/1960 | Switzerland. |

OTHER REFERENCES

"Visualized Physics" (Taffel), published by Oxford Book Co. (N.Y.), 1963. (Page 229 relied upon.)

HUGO O. SCHULTZ, *Primary Examiner.*

SAMUEL F. COLEMAN, *Examiner.*

H. C. HORNSBY, *Assistant Examiner.*